(No Model.)

W. M. ROWELL.
METHOD OF AND DEVICE FOR GRAFTING.

No. 471,573. Patented Mar. 29, 1892.

Witnesses
Jas. K. McCathran
N. T. Collamer

Inventor
William M. Rowell
By his Attorneys,
C. A. Snow & Co.

UNITED STATES PATENT OFFICE.

WILLIAM M. ROWELL, OF FORT MEADE, FLORIDA.

METHOD OF AND DEVICE FOR GRAFTING.

SPECIFICATION forming part of Letters Patent No. 471,573, dated March 29, 1892.

Application filed May 23, 1891. Serial No. 393,875. (No model.)

*To all whom it may concern:*

Be it known that I, WILLIAM M. ROWELL, a citizen of the United States, residing at Fort Meade, in the county of Polk and State of Florida, have invented a new and useful Improvement in Grafting and Budding Plants, of which the following is a specification.

This invention relates to the care of plants, and more especially to the grafting and budding of bushes and other citrus fruits and shrubbery.

The object of the invention is to produce certain improvements in this art.

To this end the invention consists of the details of construction hereinafter more fully described and claimed, and as illustrated on the sheet of drawings, wherein—

Figure 1:
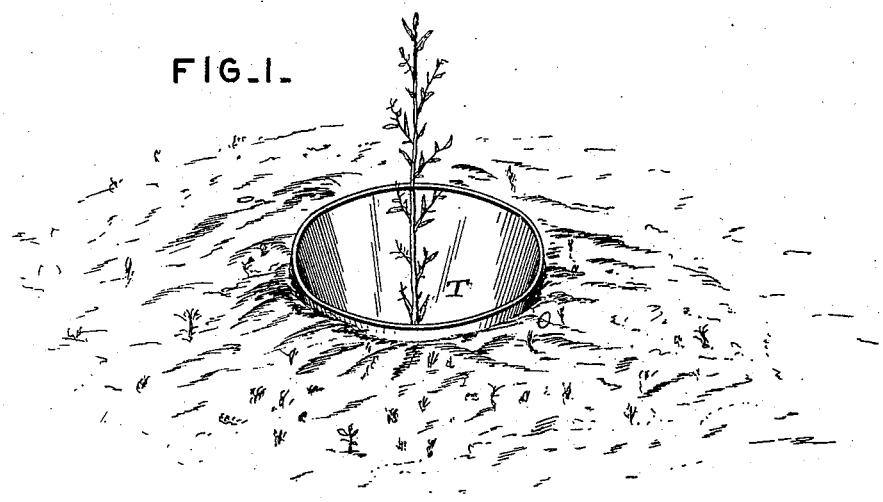
Figure 2:
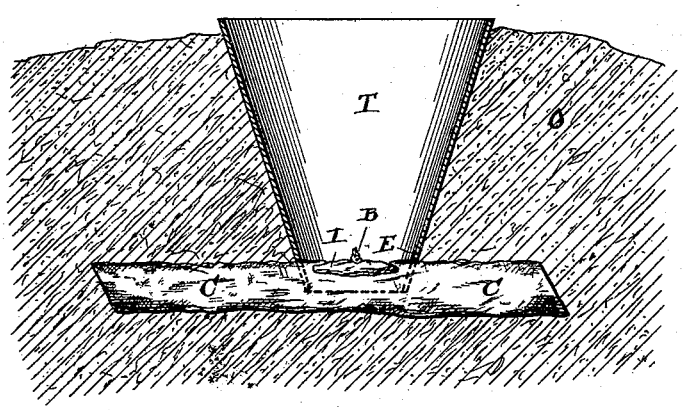
Figure 3:
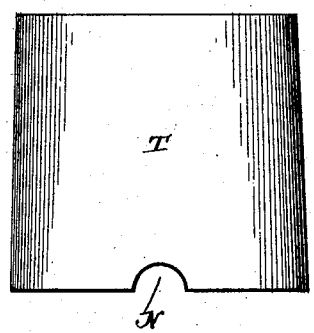
Figure 4:
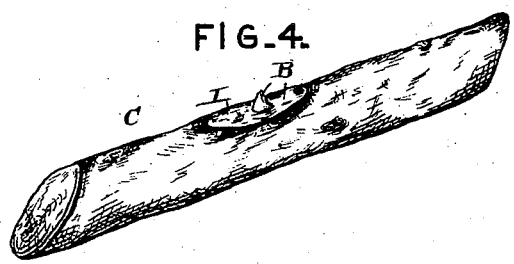

Figure 1 is a general perspective view of the device set in the ground over a cutting of grown bush. Fig. 2 is a central longitudinal section of the device, the cutting of bush, and the twig or bud. Fig. 3 is a side elevation of the tube. Fig. 4 is a perspective detail of the cutting and bud.

Referring to the said drawings, the letter T designates a cylindrical tapering body of metal open at top and bottom and which has the lower end E contracted laterally, as shown. The outer and inner faces of this cylindrical body are preferably coated or painted with a dark pigment to prevent the tube from rusting and from gathering or accumulating an excessive degree of heat, and hence to keep the bud cool and moist. In the sides of the tube, at its lower end, are transversely-registering notches N, as seen in Fig. 3, and these notches are preferably of semicircular shape and of about the relative size and proportion shown.

The letter C designates a cutting having an eye I, as best seen in Fig. 4, and B is the bud or twig inserted in said eye in the process of grafting, as well understood by those familiar with this art.

In applying the tube T to the budded cutting I proceed as follows: The earth or ground is removed for a sufficient depth, and the cutting, with the bud therein, is laid in the hole thus formed, the cutting being in an approximately horizontal position with the bud on its upper side. The tube T is then placed over the cutting, the notches N resting on said cutting, as seen, and the ground is filled in around the tube so as to completely cover the ends of the cutting to, but not inside, the tube, and preferably leaving a small portion of the upper end of the tube projecting from the ground to indicate its presence. No especial care, such as watering or weeding, is then necessary, and the tapering shape of the tube directs sufficient water to the cutting and also prevents insects from having access to the delicate bud with injurious results. After the bud has sprouted the tube is removed and the earth filled in around the sprout, thus bracing the latter firmly about its roots, yet not disconnecting it from its hard-wood foundation.

It is well known that the improved varieties of thornless and seedless oranges are more desirable and more speedily remunerative than the seedling grove, which is so tardy of growth that few have the patience to make it a success; but there is no denying or ignoring the fact that the cold snaps of recent years have materially checked and hindered the budding business. My improved method obviates this difficulty, as both the bud and the limb into which it is inserted take root, the growth is rapid, and the branches spread out, forming protection against frost; but should the tree be killed by frost to the ground, which is not likely, it comes up from the ground the same and in two or three years is bearing again without the expense and delay of rebudding, with no scars from the budding-knife to mar the beauty of the tree and induce disease.

Considerable change in the details of construction, the size, and the shape of the tube may be indulged in, as experiment and practice will lead the experienced fruit-grower to believe advisable, all without departing from the spirit of the present invention.

I claim as the salient features of my invention—

1. The herein-described budding device, the same consisting of a tapering body approximately cylindrical at its upper end and contracted laterally at its lower end, the sides of said lower end being provided with opposite notches taking over the cutting to inclose the bud in said cutting entirely within the tapering body, as and for the purpose hereinbefore set forth.

2. The herein-described method of budding, the same consisting of embedding the bud in the cutting, seating the latter in a hole in the ground with the bud uppermost, inclosing the bud and portion of the cutting, holding the same in the lower end of a removable tapered body open at both ends, filling the earth around the exterior of the body, and removing the latter and filling in earth after the bud has sprouted, substantially as and with the results set forth.

In testimony that I claim the foregoing as my own I have hereto affixed my signature in presence of two witnesses.

WILLIAM M. ROWELL.

Witnesses:
JAMES A. STEPHENS,
U. A. LIGHTSEY.